(12) United States Patent
Lin et al.

(10) Patent No.: US 7,882,770 B2
(45) Date of Patent: Feb. 8, 2011

(54) MACHINE WITH IMPROVED FEEDING AND CLAMPING DEVICES

(75) Inventors: Chen-Han Lin, Taichung (TW); Yong-Sheng Chen, Taichung (TW)

(73) Assignee: Way Train Industries Co., Ltd., Taichung (TW)

( * ) Notice: Subject to any disclaimer, the term of this patent is extended or adjusted under 35 U.S.C. 154(b) by 166 days.

(21) Appl. No.: 12/372,784

(22) Filed: Feb. 18, 2009

(65) Prior Publication Data

US 2010/0206143 A1  Aug. 19, 2010

(51) Int. Cl.
*B23B 13/00* (2006.01)
*B23B 3/00* (2006.01)
(52) U.S. Cl. .......................................... 82/124; 82/127
(58) Field of Classification Search ................... 82/124, 82/125, 126, 127; 198/506, 510.1; 226/52, 226/102, 108; 483/30; 409/172; 29/563; 414/14
See application file for complete search history.

(56) References Cited

U.S. PATENT DOCUMENTS

| | | | | |
|---|---|---|---|---|
| 2,345,207 A | * | 3/1944 | Mansfield | ..................... 82/126 |
| 3,250,180 A | * | 5/1966 | Eitlhuber | ..................... 409/210 |
| 3,995,524 A | * | 12/1976 | Lederer | ........................ 82/125 |
| 4,317,394 A | * | 3/1982 | Link et al. | ..................... 82/124 |
| 5,946,790 A | * | 9/1999 | Graham et al. | ................. 29/564 |
| 6,055,892 A | * | 5/2000 | Otake | .......................... 82/124 |

FOREIGN PATENT DOCUMENTS

TW     266119     6/2005

* cited by examiner

*Primary Examiner*—Will Fridie, Jr.
(74) *Attorney, Agent, or Firm*—Alan Kamrath; Kamrath & Associates PA

(57) ABSTRACT

A feeding device is installed on a machine and is utilized to convey a workpiece to be machined. The feeding device includes first and second feeding apparatus and in conveying the workpiece the workpiece has two lateral sides engaged by the first and second feeding apparatuses respectively. A clamping device is installed on the machine and is utilized to hold the moving workpiece. The clamping device includes first clamping mechanism including first and second clamping apparatuses and a second clamping mechanism including a third clamping apparatus, with the first and second clamping device holding the lateral sides of the workpiece and with the third clamping apparatus holding the top side of the workpiece.

10 Claims, 20 Drawing Sheets

MACHINE WITH IMPROVED FEEDING AND CLAMPING DEVICES

BACKGROUND OF THE INVENTION

1. Field of the Invention

The present invention relates to a machine that has improved feeding and clamping devices, with the feeding device conveying a workpiece to be machined, and with clamping device holding the moving workpiece.

2. Description of the Related Art

TW Pat. No. M266119 discloses a band-sawing machine with a clamping device and the clamping device is utilized to assist machine operator to feed a workpiece on a track precisely, and the workpiece has two lateral sides engaged by the clamping device. But, it is noticed that when the workpiece which is supposed to be levelly placed on a worktable of the machine is about to go on the track between the clamping device, one of the lateral side is likely to be raised up from the worktable by the clamping device due to that the operator feeds the workpiece askew from the track.

The present invention is, therefore, intended to obviate or at least alleviate the problems encountered in the prior art.

SUMMARY OF THE INVENTION

According to the present invention, a feeding device is installed on a machine and is utilized to convey a workpiece to be machined. The feeding device includes first and second feeding apparatus and in conveying the workpiece the workpiece has two lateral sides engaged by the first and second feeding apparatuses respectively. A clamping device is installed on the machine and is utilized to hold the moving workpiece. The clamping device includes first clamping mechanism including first and second clamping apparatuses and a second clamping mechanism including a third clamping apparatus, with the first and second clamping device holding the lateral sides of the workpiece and with the third clamping apparatus holding the top side of the workpiece.

It is an aspect of the present invention that the clamping device ensures the workpiece to be conveyed on a worktable of the machine without the risk of from raising up from the worktable.

It is another aspect of the present invention that the operator will not risk to press the raised-up workpiece by hand.

It is a further aspect of the present invention that the feeding and clamping devices together ensure the workpiece to a precise machining position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

DETAILED DESCRIPTION OF THE PREFERRED EMBODIMENT

Figure 1:
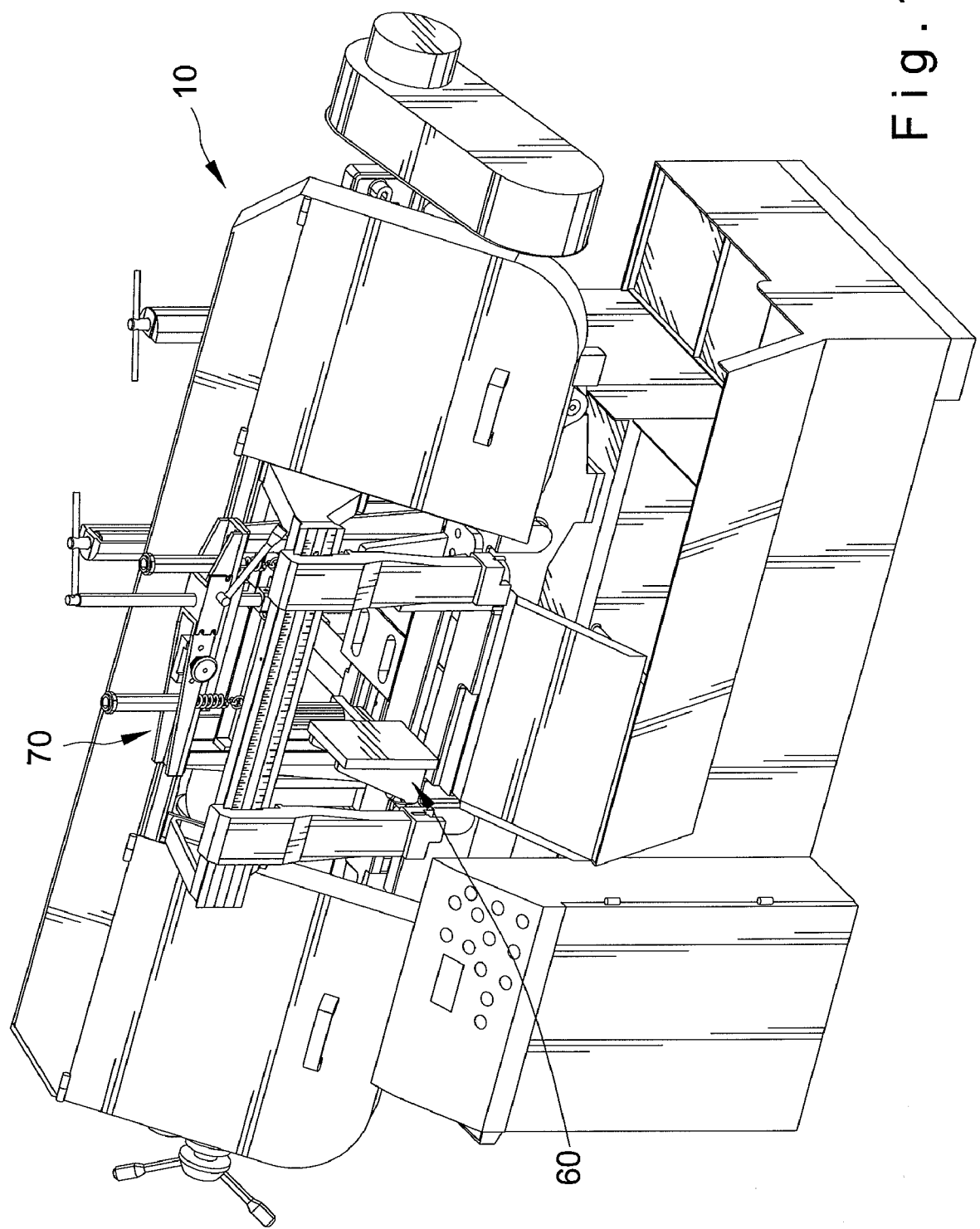
FIG. 1 is a perspective view of a machine with improved feeding and clamping devices in accordance with the present invention.
Figure 2:
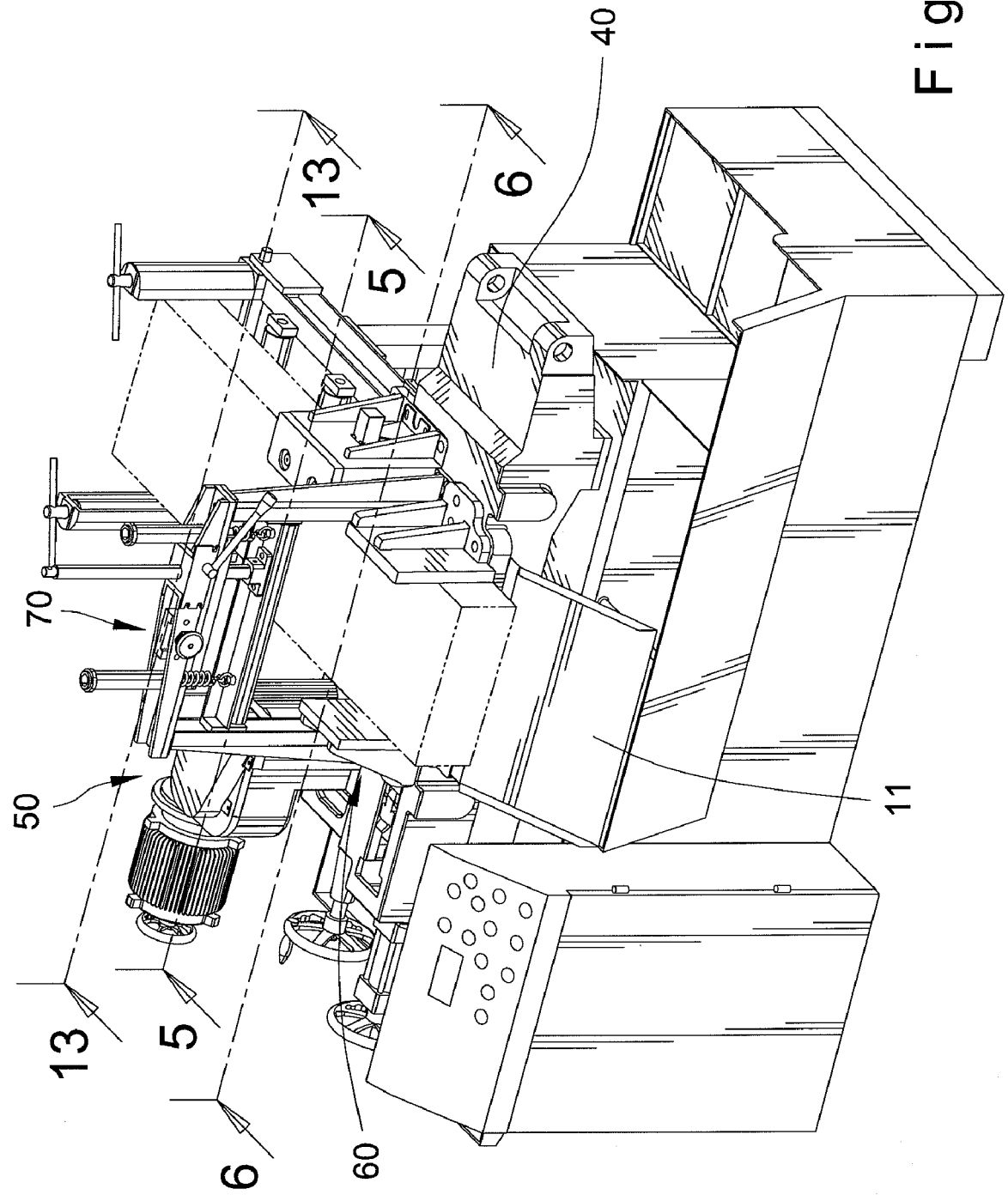
FIG. 2 is another perspective view of the machine shown in FIG. 1 but without the shield, in order to clearly show feeding and clamping devices, and a workpiece is fed and clamped by the devices, with the workpiece shown in phantom.
Figure 3:
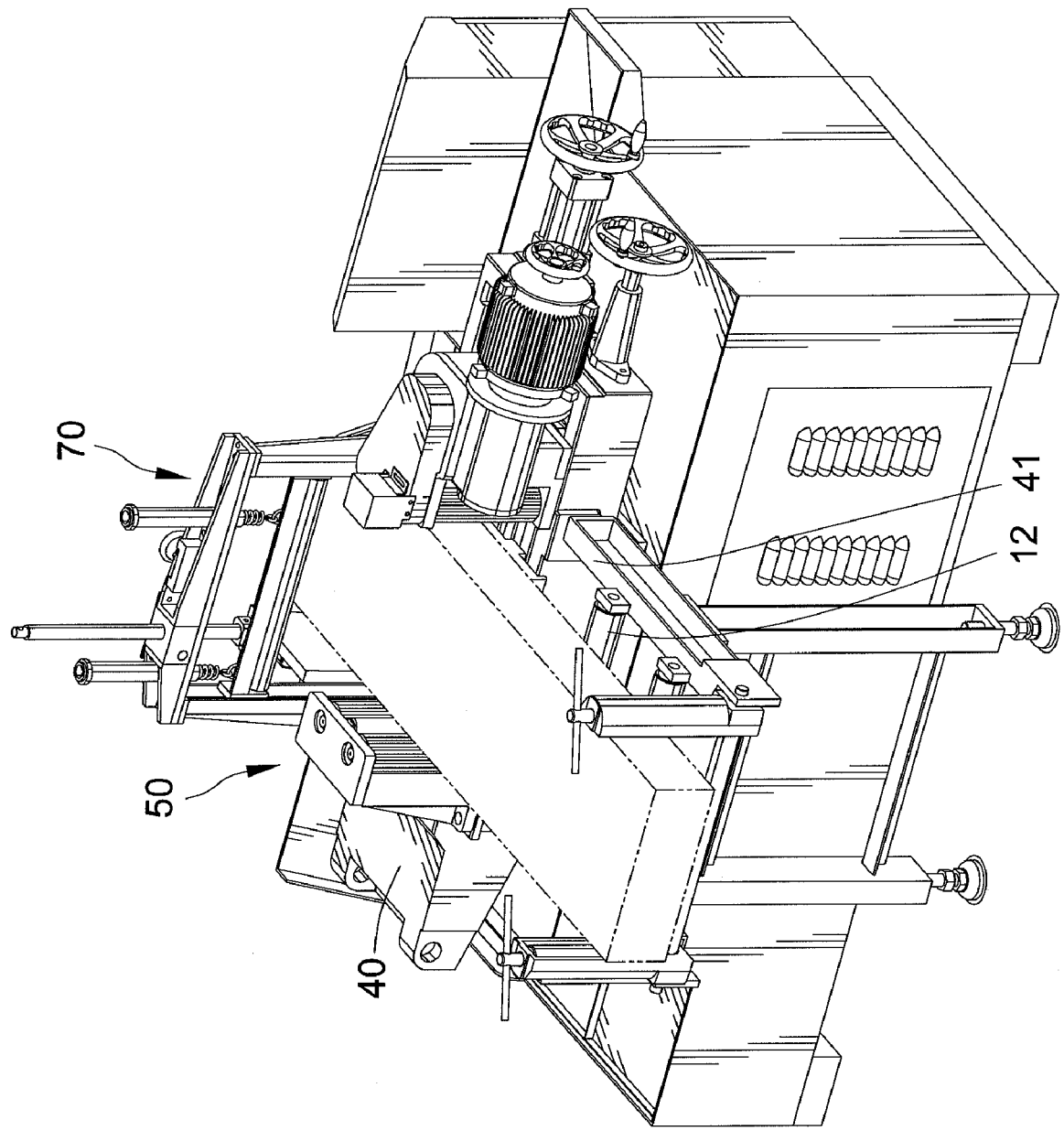
FIG. 3 is a perspective view showing the machine and the workpiece of FIG. 2, but viewed from a different angle.

FIGS. 1 through 3 show a feeding device 50 and a clamping device which includes first and second clamping mechanisms 60 and 70 have application on a band-sawing machine 10.

The feeding device 50 is utilized to convey a workpiece (shown in phantom) to be machined and in order to ensure that the workpiece does not suffer the problem set forth in the Description of the Related Art the clamping device is utilized to hold the moving workpiece. Moreover, the machine 10 includes a plurality of conveying members 12 on which the workpiece is adapted to be placed prior to that the feeding device 50 engages the workpiece. With the conveying members 12, the workpiece is supported and it is beneficial if operator is handling a bulky workpiece. Further, each of the plurality of conveying members 12 is configured to be rotatable about a rotation axis and since it is rotatable the workpiece thereon is adapted to be moved at ease. Also, FIGS. 1 and 2 show that the machine 10 is equipped with a guiding member 11 for directing parts which have been machined already to a collector for example.

Figure 4:
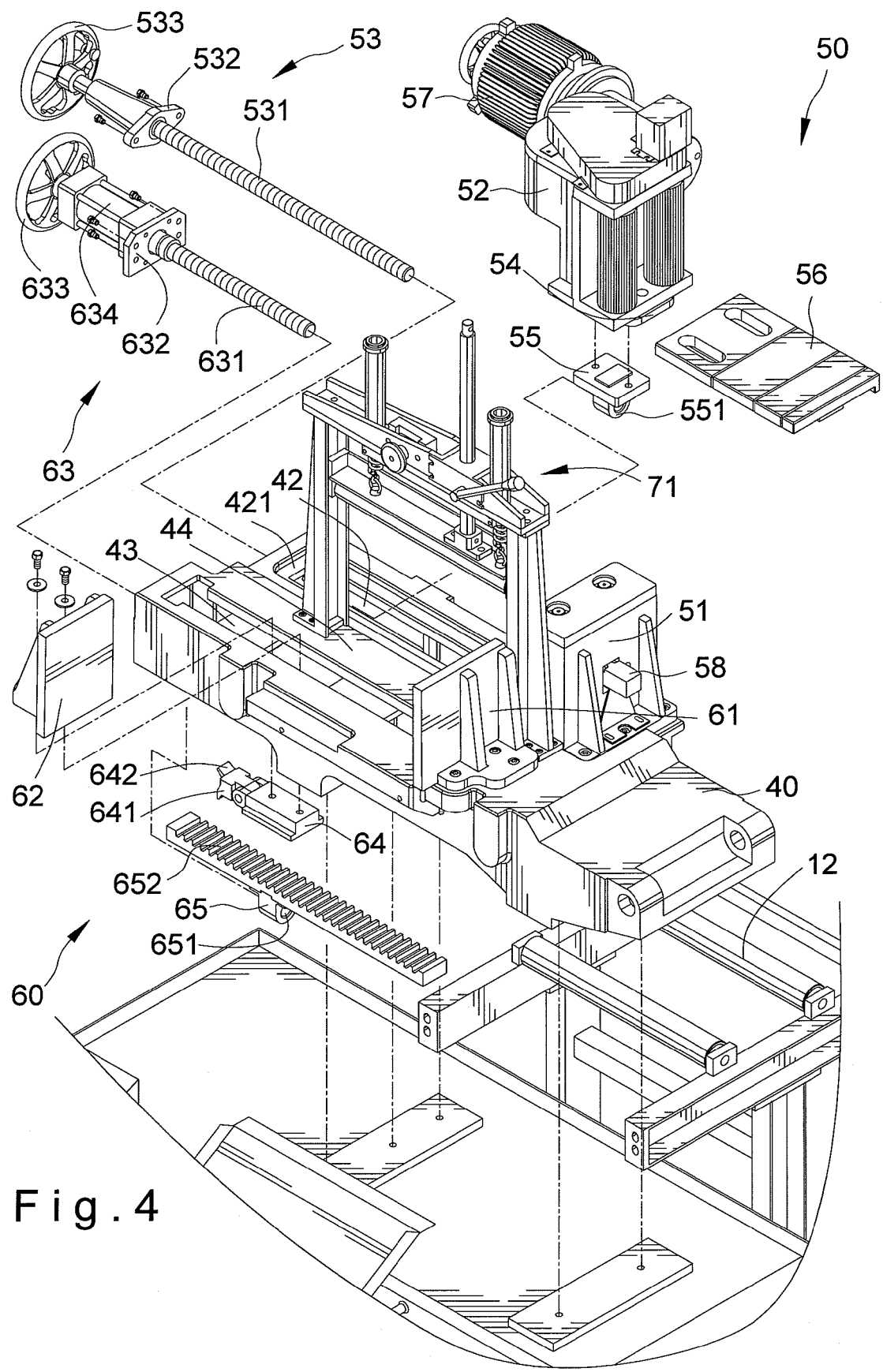
FIG. 4 is a partial, exploded perspective view of a feeding device and a clamping device of the machine, particularly, a first clamping mechanism of the clamping device.

Referring to FIG. 4, the feeding device 50 is installed on a worktable 40 and includes first feeding and second feeding apparatus 51 and 52 disposed opposite one another. Each of the first and second feeding apparatuses 51 and 52 includes a rolling member with ridges (not numbered). With the ridges, the workpiece can be prevented form being askew with a predetermined feeding direction. In the preferred embodiment, each of the first and second feeding apparatuses 51 and 52 includes two rolling members. Further, the two rolling members of the second feeding apparatus 52 may be driven by a motor 57.

Figure 5:
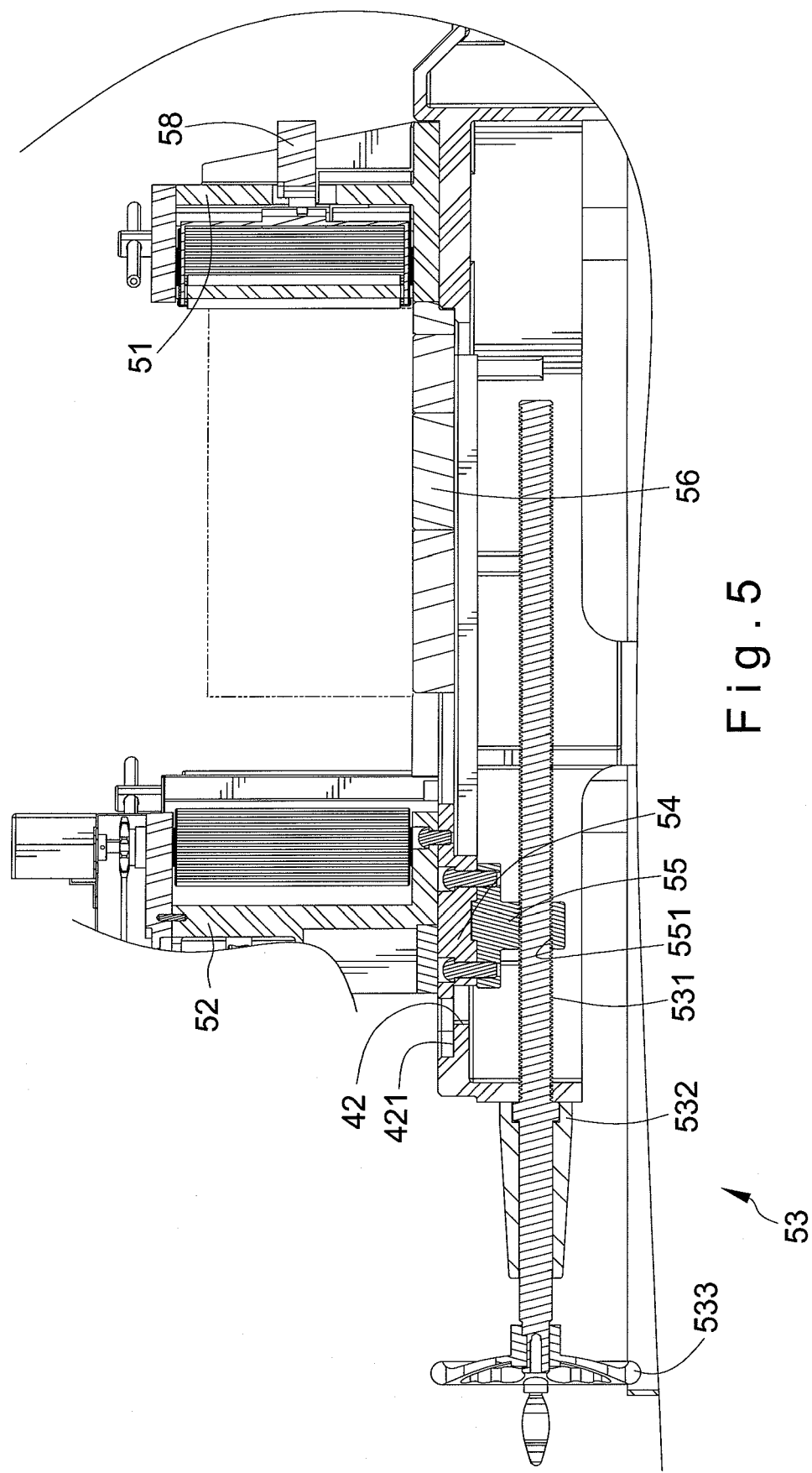
FIG. 5 is a partial, cross-sectional view taken along line 5-5 of FIG. 2.
Figure 7:
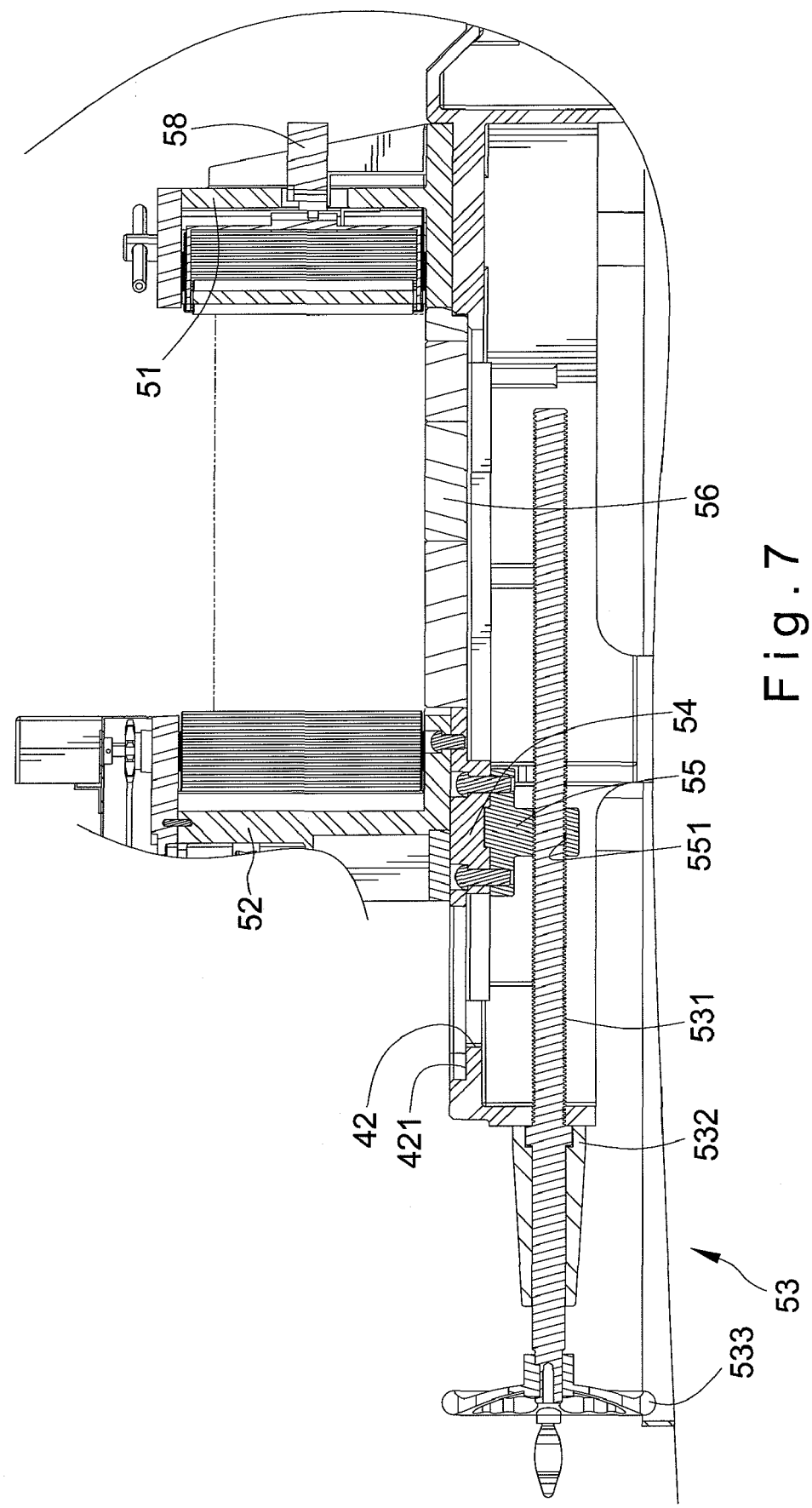
FIG. 7 is an extended cross-sectional view of FIG. 5, showing the feeding device is in a position delivering the workpiece
Figure 8:
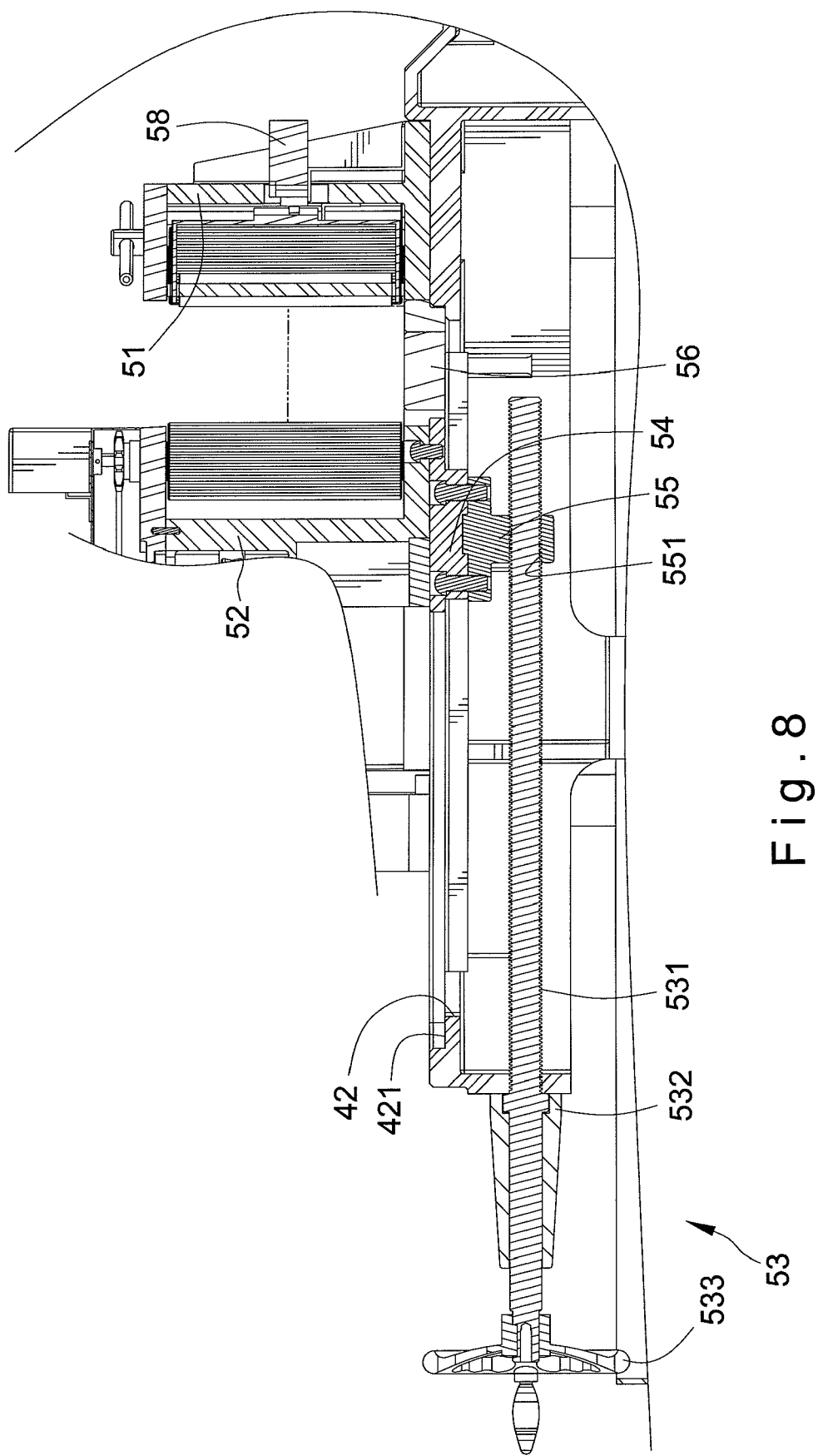
FIG. 8 is an extended cross-sectional view of FIG. 7, showing the feeding device is adapted for delivering a smaller size workpiece.

The first feeding apparatus 51 is preferably fixed on the worktable 40, and the second feeding apparatus 52 is moveably installed on the worktable 40 and is operably moveable toward and away from the first feeding apparatus 51. In the preferred embodiment, the second feeding apparatus 52 is moveable in a first groove 42 formed on the worktable 40. The second feeding apparatus 52 includes a first sliding member 55 integrated therewith, particularly connected to a plate 54 formed at the bottom of the second feeding apparatus 52. The first sliding member 55 is supported by an edge 421 of the first groove 42 and includes a first threaded section 551. A first adjustor 53 includes a shank formed with a second threaded section 531 is in engagement with the first threaded section 551, and by operably rotating the second threaded section 531 relative to the first threaded section 551, the first sliding member 55 is axially moveable with respect to the first adjustor 53, and thus the second feeding apparatus 52 is adjustably moveable in an axial direction toward and away from the first feeding apparatus 51 by operation of the first adjustor 53 (as shown in FIGS. 5, 7, and 8). FIG. 8 shows that the feeding device 50 is adapted for delivering a smaller size workpiece. Moreover, the worktable 40 includes a compartment 41 below and in communication with the first groove 42 for accommodating the second threaded section 531 of the first adjustor 53. Additionally, the first adjustor 53 includes a connecting portion 532 for installing the first adjustor 53 on the worktable 40 and a controlling portion 533 for operably rotating the second threaded section 531.

FIGS. 5, 7 and 8 also show that the workpiece is supported by a plurality of shielding members 44. The shielding members 44 not only elevate the workpiece but also prevents dust falling into the compartment 41 through the first groove 42. Additionally, it is noticed that the number of the shielding members 44 is arbitrarily controlled so that the workpiece has a first crosswise distance and the plurality of shielding members 44 total to a second crosswise distance less than the first crosswise distance. Thus, the first and second feeding apparatuses 51 and 52 are not obstructed by the plurality of shielding members to frictionally engage with two opposite lateral sides of the workpiece.

Moreover, a sensor 58 may be utilized in the first feeding apparatus 51 to turn off the machine 10 if the sensor 58 does not detect a workpiece is engaged by the feeding device 50.

Figure 6:
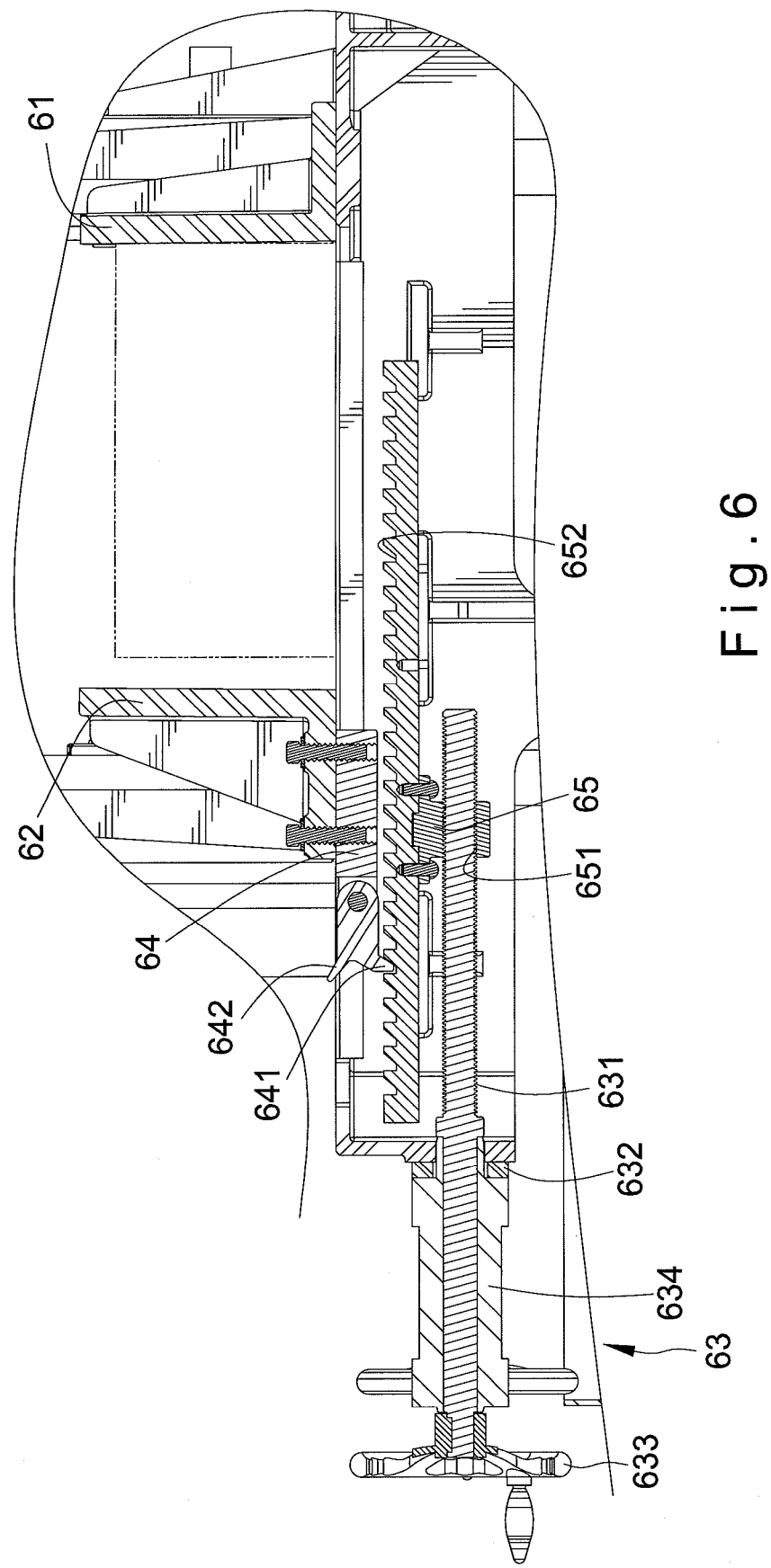
FIG. 6 is a partial, cross-sectional view taken along line 6-6 of FIG. 2.
Figure 9:
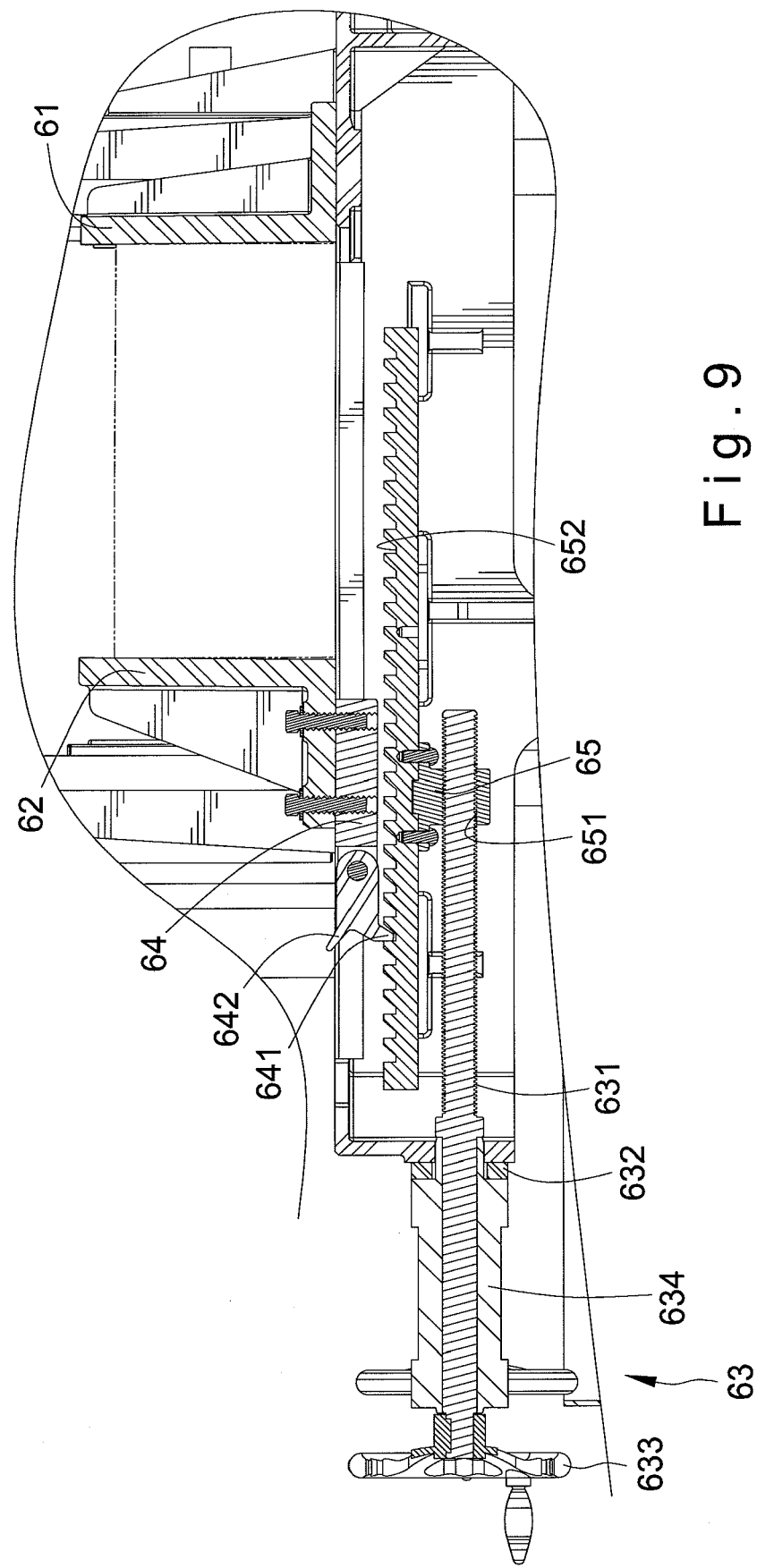
FIG. 9 is an extended cross-sectional view of FIG. 6, showing the first clamping mechanism is in a position holding the workpiece.
Figure 10:
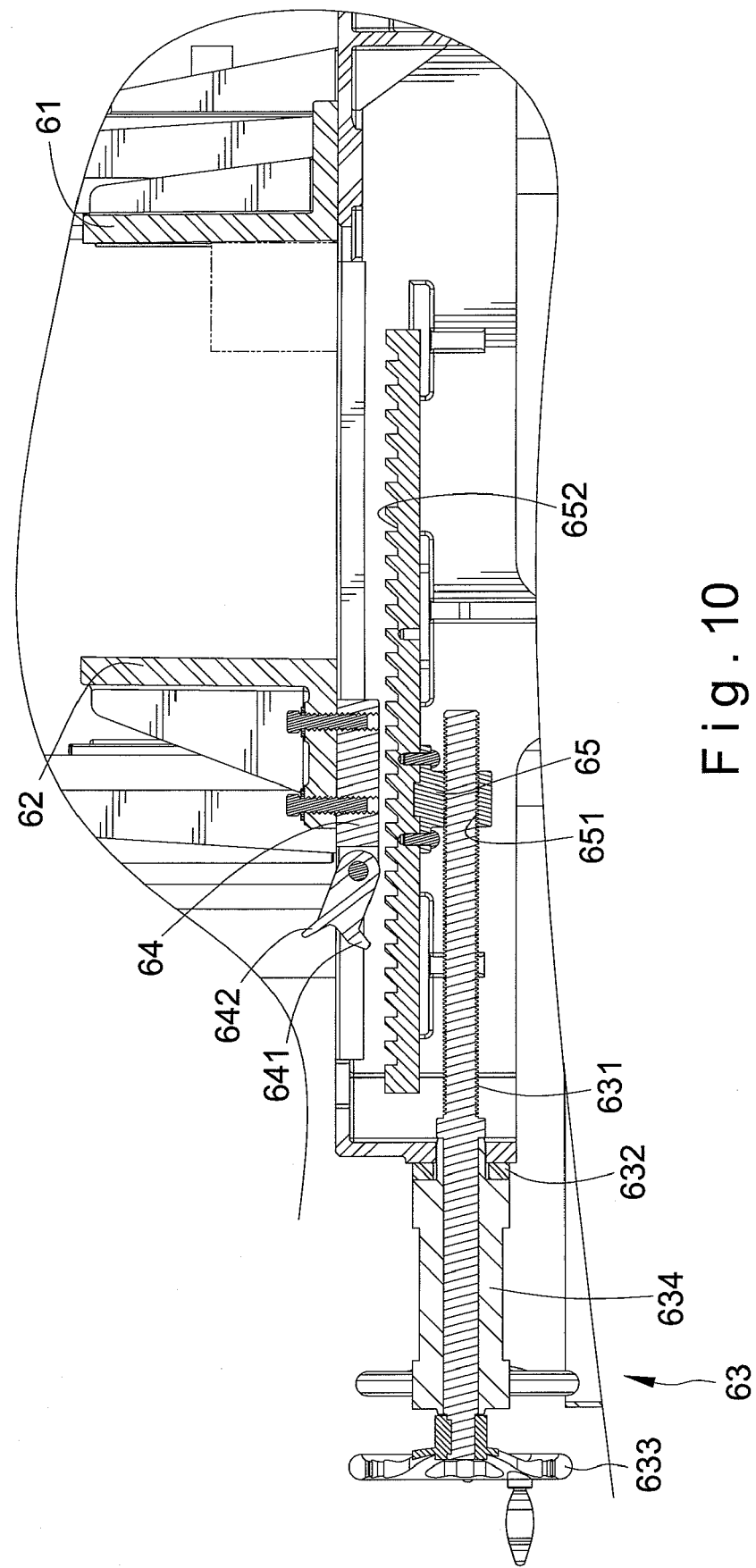
FIG. 10 is an extended cross-sectional view of FIG. 9, showing the first clamping device is in a position such that it can be adjusted to hold a smaller size workpiece.
Figure 11:
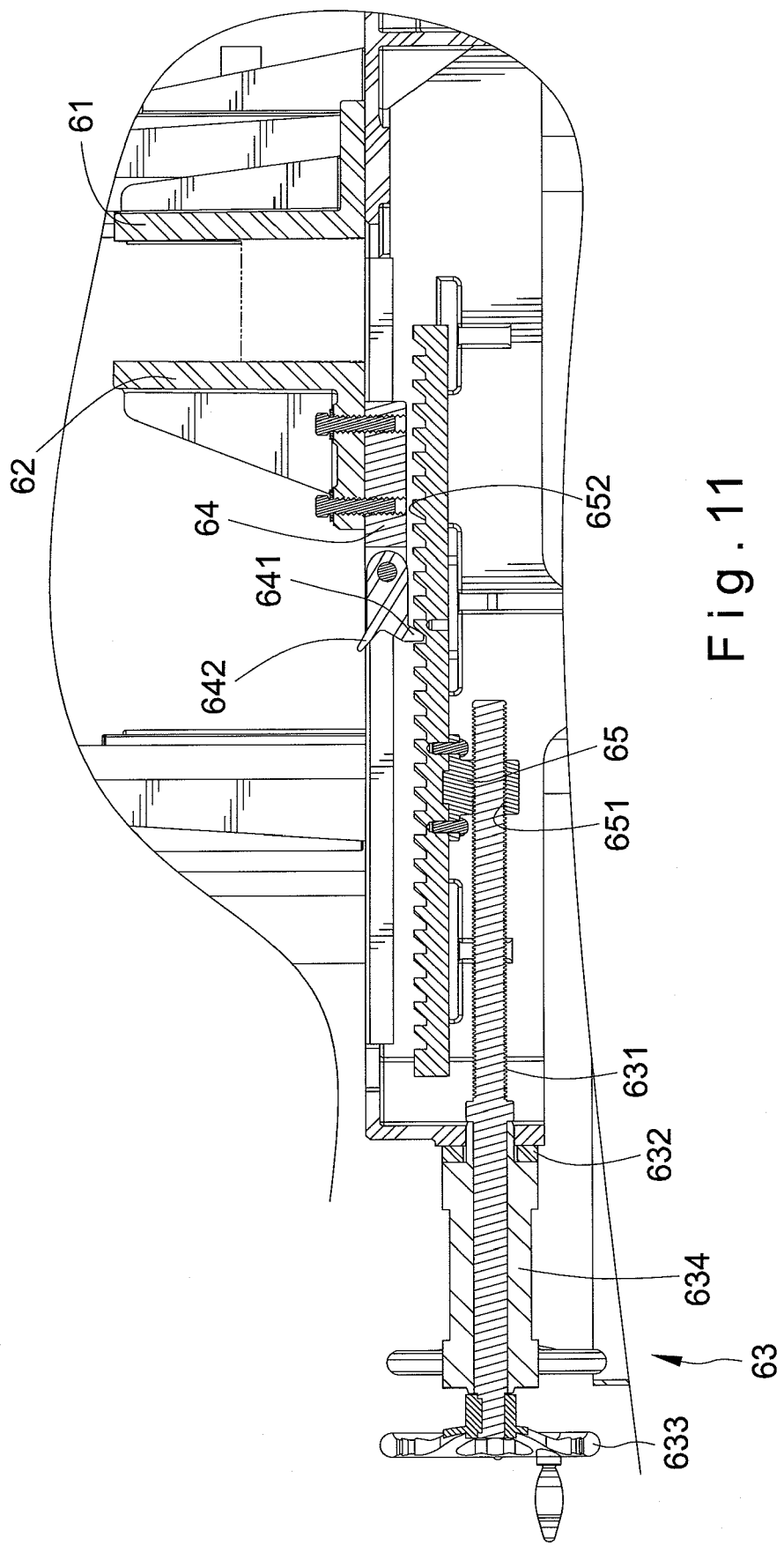
FIG. 11 is an extended cross-sectional view of FIG. 10, showing the first clamping device is in a position holding the smaller size workpiece.

The first clamping mechanisms 60 is fixed on the worktable 40 and includes first and second clamping apparatuses 61 and 62 disposed opposite to each other. The first and second clamping apparatuses 61 and 62 include first and second engaging sections respectively, and the first clamping device 61 is preferably fixed on the worktable 40 and the second clamping apparatus 62 is moveably installed on the worktable 40 and is operably moveable toward and away from the first clamping apparatus 61. In the preferred embodiment, the second clamping apparatus 62 is moveable in a second groove 43 formed on the worktable 40. The second clamping apparatus 62 includes a third adjustor 64 integrated therewith. A second adjustor 63 includes a shank formed with a third threaded section 631. A second sliding member 65 includes a fourth threaded section 651 in engagement with the third threaded section 631 and a plurality of positioning sections 652 with one of which in releasable engagement with the third adjustor 64. The second sliding member 65 is axially moveable with respect to the second adjustor 63 by operably rotating the fourth threaded section 651 relative to the third threaded section 631 (as shown in FIGS. 6 and 9). The third adjustor 64 is axially moveable with respect to the second sliding member 65 when the third adjustor 64 is away from the plurality of positioning sections 652 (as shown in FIG. 10). Thus, the second clamping apparatus 62 is adjustably moveable in an axial direction toward and away from the first clamping apparatus 61 by moving the third adjustor 64 away from the plurality of positioning sections 652 and is further adjustable after the third adjustor 64 is in engagement with one of the plurality of positioning sections 651 by operation of the second adjustor 63.

Preferably, each of the plurality of positioning sections 652 is spaced at a first distance, and the third thread section 631 includes a thread pitch defining a second distance, and the first distance is greater than the second distance.

Preferably, the third adjustor 64 includes a hook 641 which is pivotal for releasably engagement with the plurality of positioning sections 652 and an ergonomically designed lift 642 for user to move the third adjustor 64 away from the plurality of positioning sections 652.

Moreover, the compartment 41 is below and in communication with the second groove 43 for accommodating the third threaded section 631 of the second adjustor 63. Additionally, the second adjustor 63 includes a connecting portion 632 for installing the second adjustor 63 on the worktable 40 and a controlling portion 633 for operably rotating the second threaded section 531. Further, a hydraulic pump 634 may be utilized in the second adjustor 63 for facilitating the operation thereof.

A supporting strut 71 is fixed at a height spaced from the worktable 40. In the preferred embodiment, the worktable 40 includes a surface 44 defined between the first and second grooves 42 and 43 and the supporting strut 71 are erected by two columns 711 mounted on the surface 44.

Figure 12:
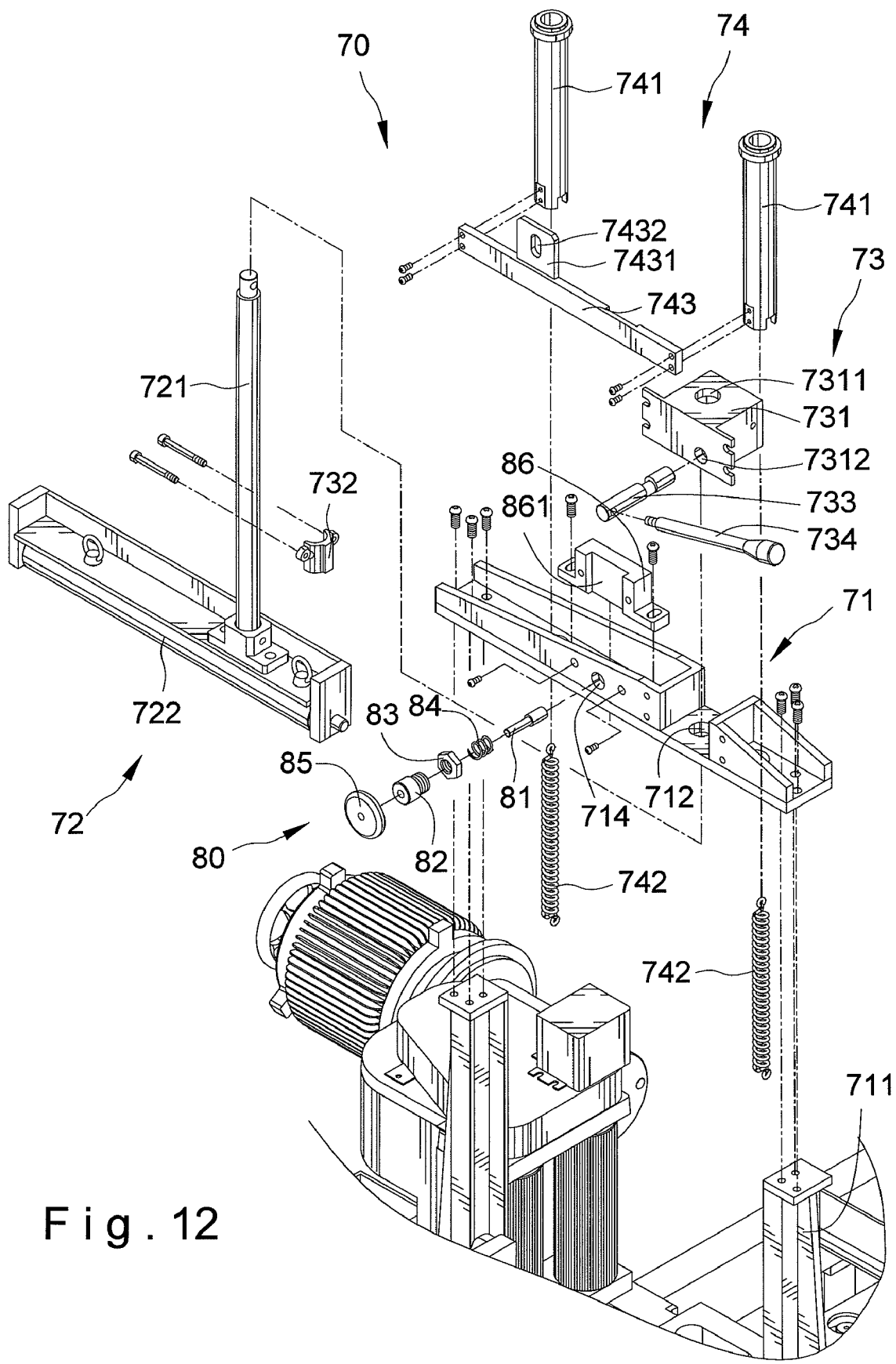
FIG. 12 is a partial, exploded perspective view of the clamping device of the machine, particularly, a second clamping mechanism of the clamping device.
Figure 13:
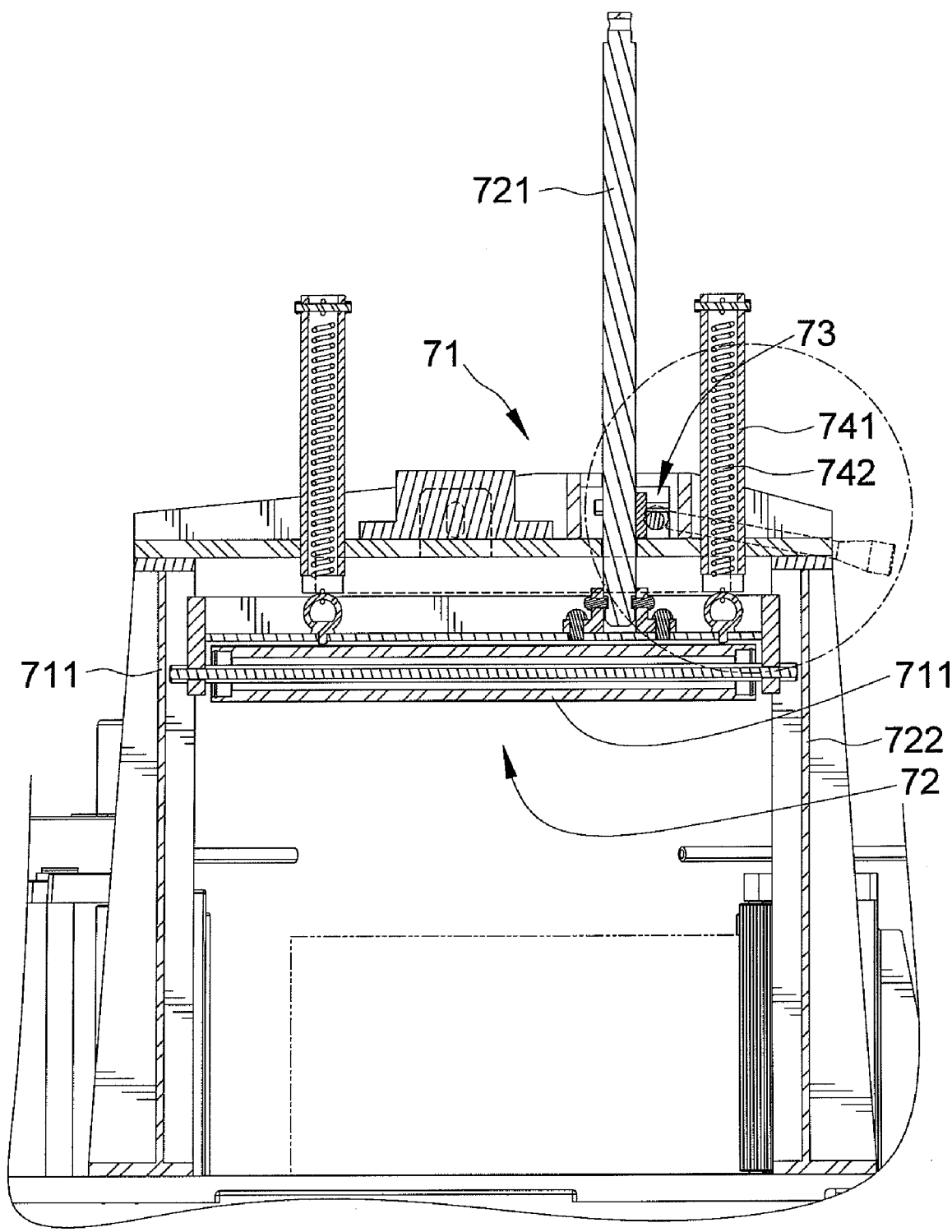
FIG. 13 is a cross-sectional view taken along line 13-13 of FIG. 2.
Figure 14:
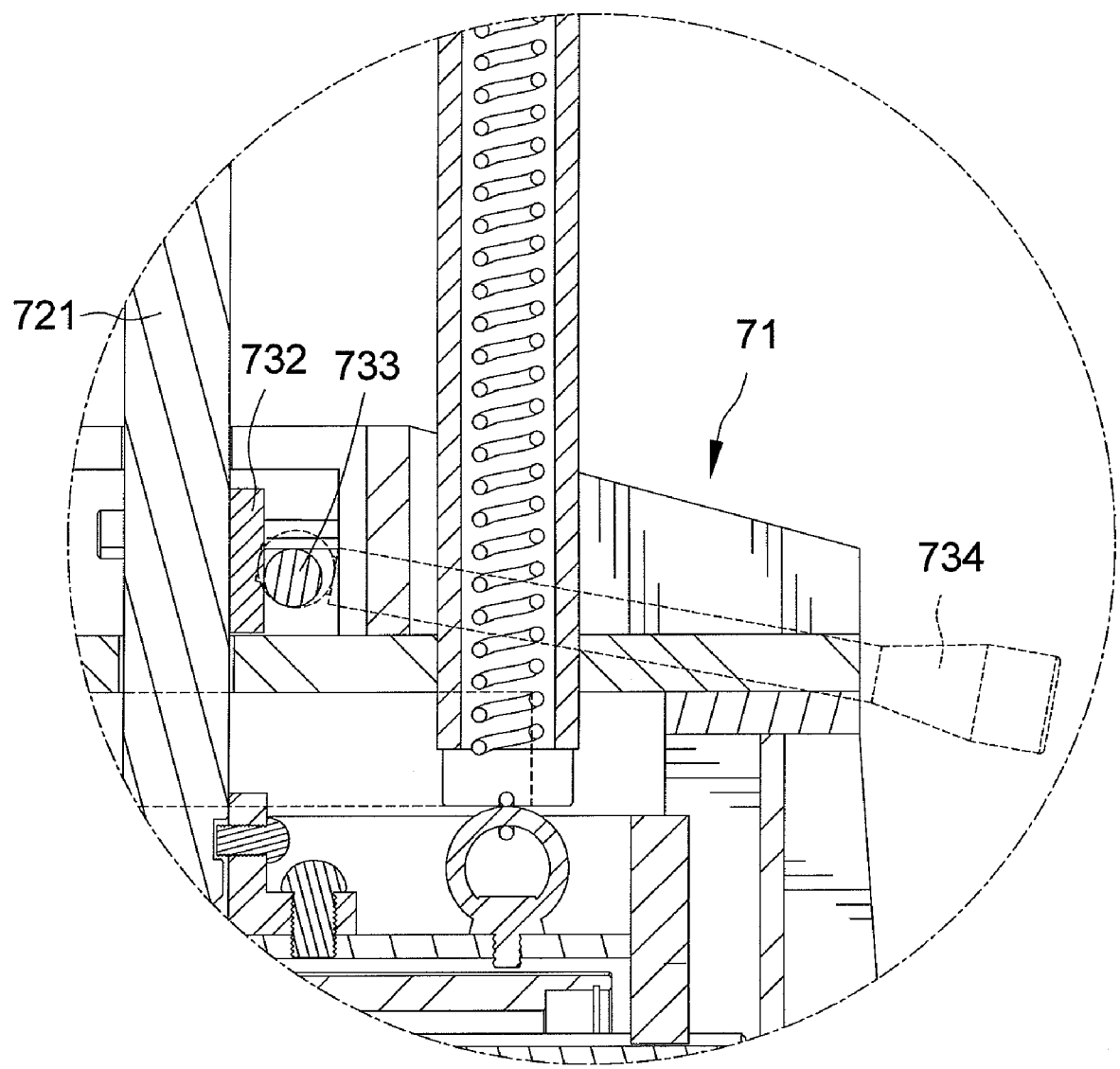
FIG. 14 is a partial, enlarged view of FIG. 13.
Figure 15:
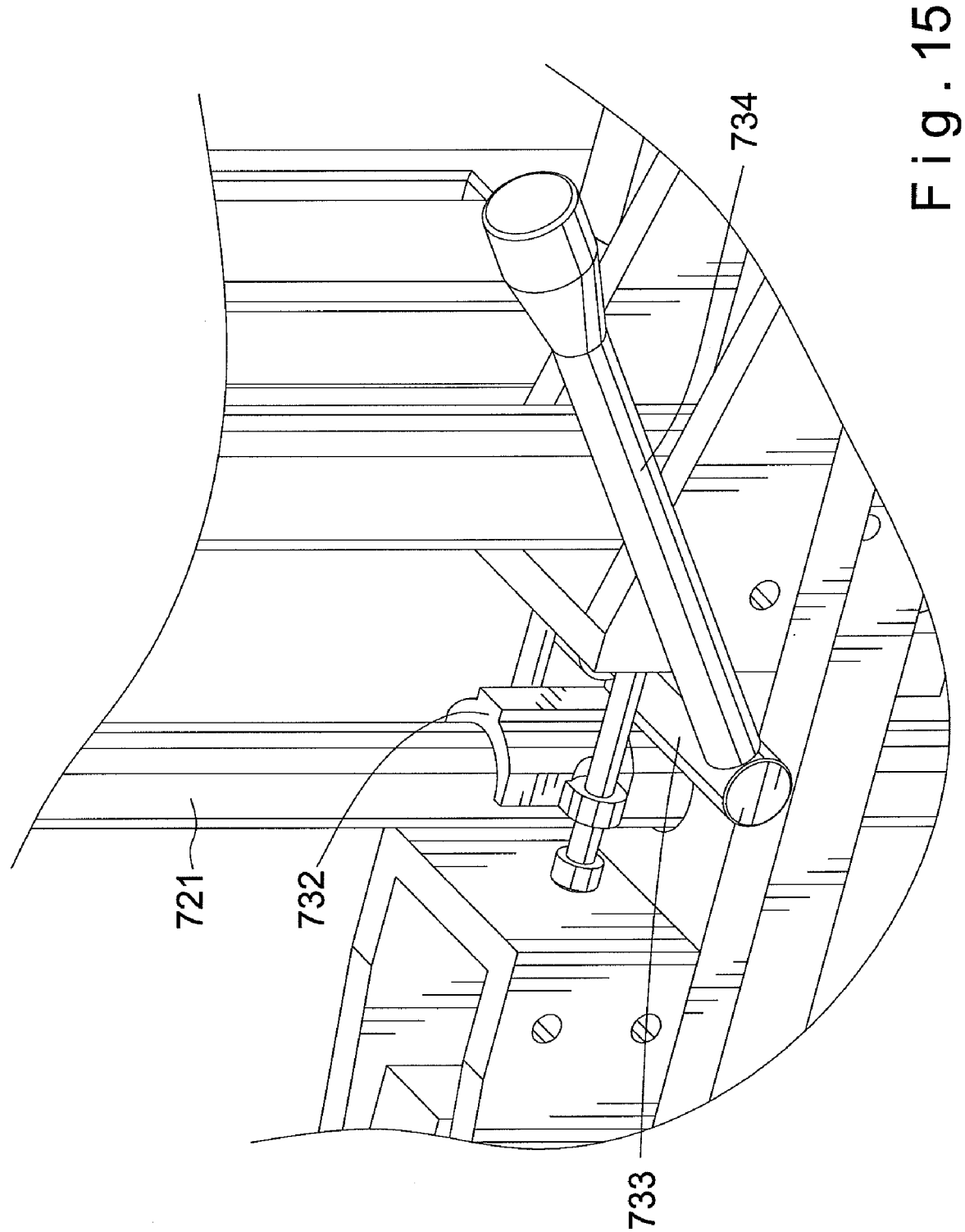
FIG. 15 is a partial, perspective view of the second clamping mechanism, showing a first control of the second clamping mechanism in a released position.

Referring to FIG. 12, the second clamping mechanism 70 includes a third clamping apparatus 72 which is moveably installed on the supporting strut 71 and is operably moveable upwardly and downwardly with respect to the worktable 40. Further, a first control 73 is operably moveable between first position to hold the third clamping apparatus 72 in stationary and a second position to unhold the third clamping apparatus such that the third clamping apparatus 72 is moveable from a higher height to a lower height. In the preferred embodiment, the first control 73 includes cam member 733 having an eccentric shape, and the cam member 733 is pivotally installed on a joining member 73, which is installed on the supporting strut 71, and is rotatable about an axis of rotation and is in engagement with the third clamping apparatus 72 when the first control 73 is in the first position. Additionally, the supporting strut 71 includes a first through hole 712, the joining member 731 includes a second through hole 7311 aligned with the first through hole 712, and the third clamping apparatus 72 includes a connecting member 721 moveably installed through the first and second through holes 712 and 7311. Further, the joining member 731 includes an aperture 7312 and the cam member 733 is received in the aperture 7312. Moreover, the first control 73 may utilize a handlebar 734 for operator to releasably engage the cam member 733 with the connecting member 721 at ease, and a pressing member 732 may be utilized between the cam member 733 and the connecting member 721. In that case, the cam member 721 is utilized to urge the pressing member 732 to releasably engage the connecting member 721.

Figure 16:
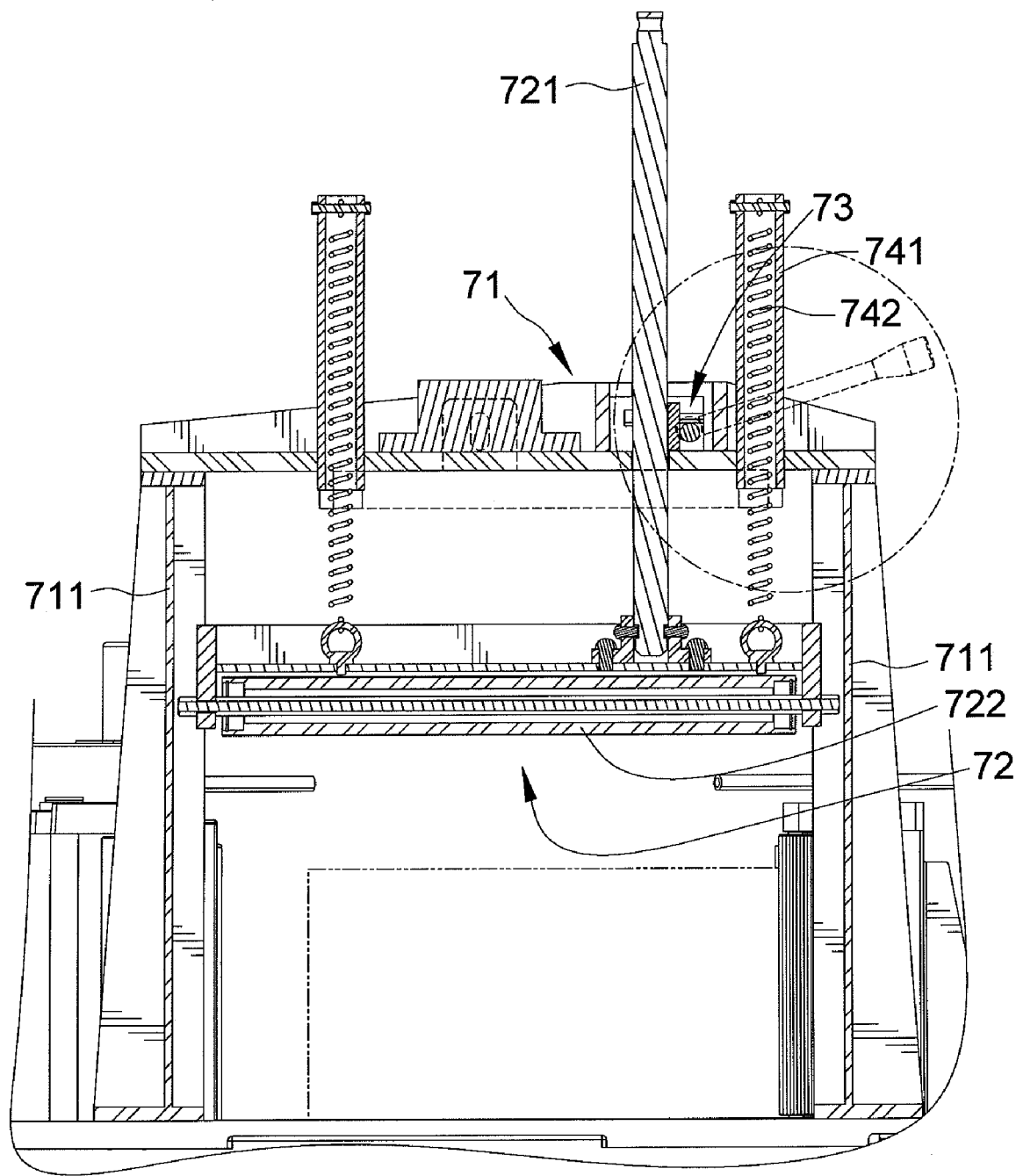
FIG. 16 is similar to FIG. 13, but the first control of the second clamping mechanism in a released position, and shows a second control of the second clamping mechanism is in an engaged position.
Figure 17:
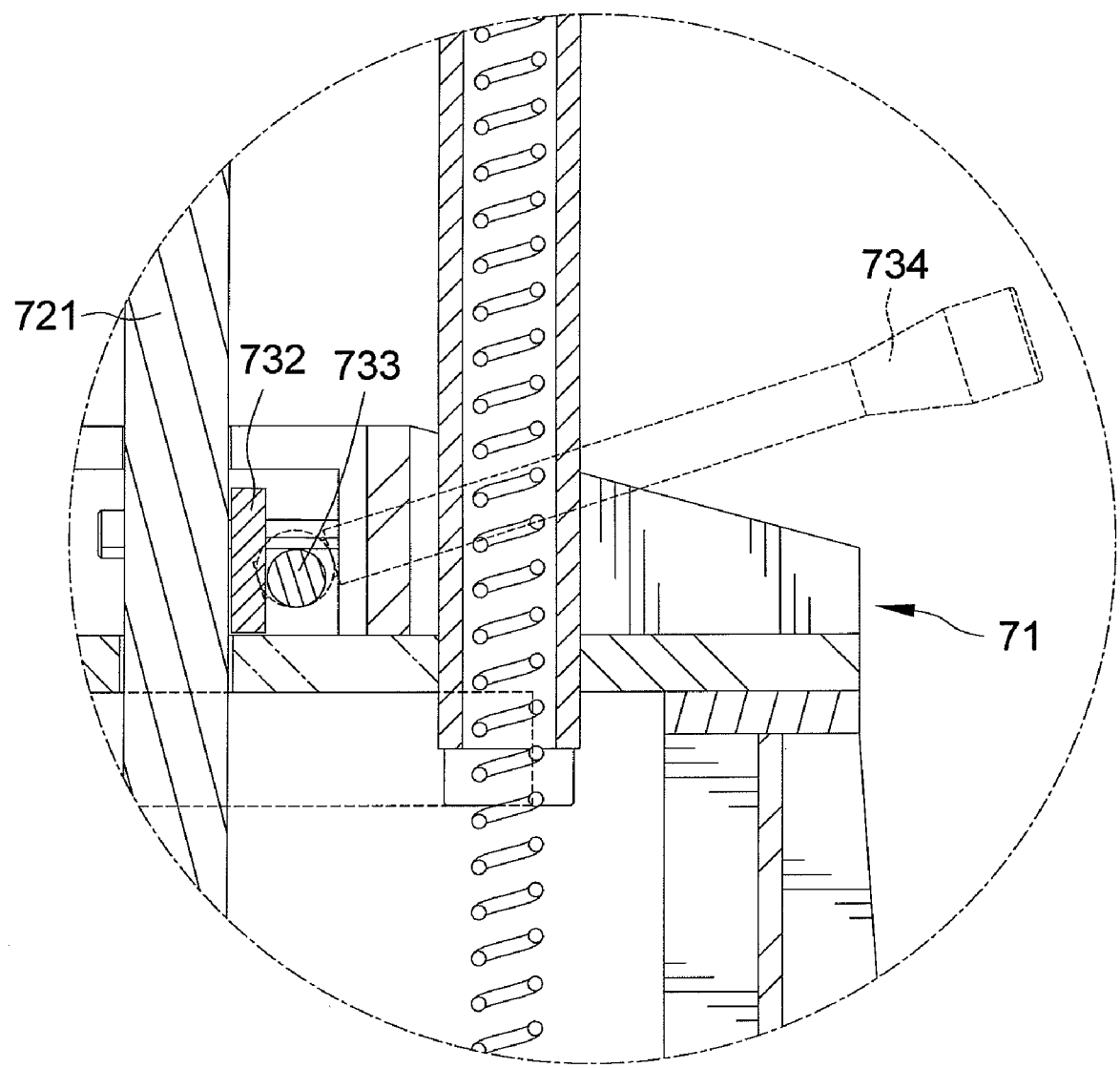
FIG. 17 is a partial, enlarged view of FIG. 16.

A lifting device 74 is installed on the supporting strut 71 and includes a first body 741 retained at a first position (as shown in FIG. 16) and a buffering apparatus 742 including a first end connected to the first body 741 and a second end connected to the third clamping apparatus 72. The buffering apparatus 742 is increasable in length to react against a weight of the third clamping apparatus 72 when the first control 73 is in the second position (as shown in FIGS. 16 and 17). As also shown in FIG. 16, the first body 741 is hollow and the buffering apparatus 742 is receivable in the first body 741 and is extendible out of the first body 741 under the weight of the third clamping apparatus. Additionally, in the preferred embodiment, the lifting device 74 includes two first bodies 741 and two buffering apparatuss 742. Further, a link 743 interconnects the two first bodies 741 and includes a ear 7431 with a through hole 7432.

Figure 20:
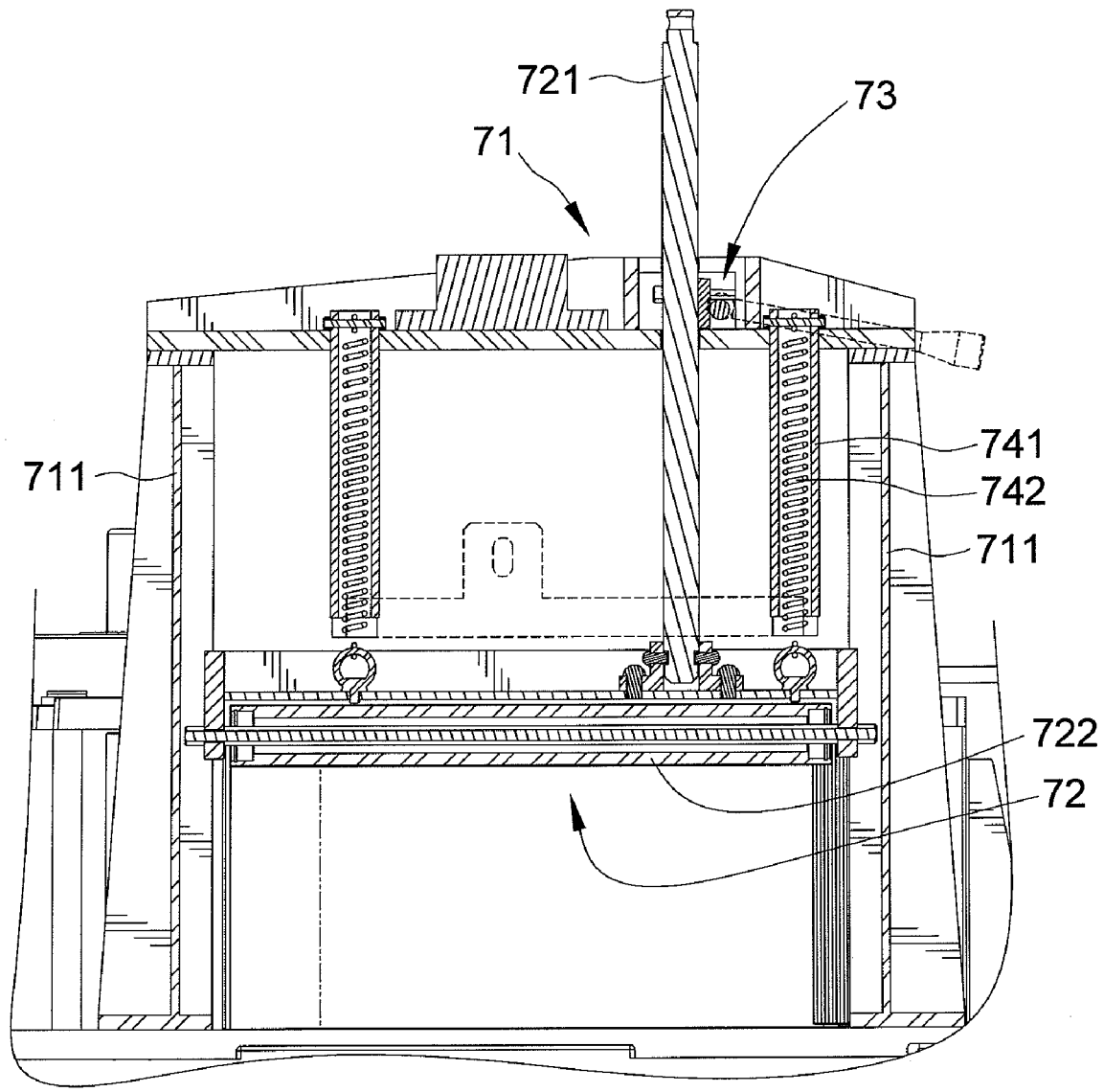
FIG. 20 is an extended cross sectional view of FIG. 16, showing the second clamping mechanism is in a position to hold the workpiece after releasing the second control, and the first control is operated in the engaged position lastly

A second control 80 is installed on the supporting strut 71 for releasably holding the lifting device 74 in stationary. Particularly, the second control 80 is operably moveable between a first position to hold the first bodies 741 in stationary and a second position to unhold the first bodies 741 such that the first bodies 741 are moveable to a higher height to a lower height (as shown in FIG. 20). In the preferred embodiment, the second control 80 includes a retaining member 81 including smaller and larger diametrical sections, a stopping member 82 in a thread engagement with hole 714 and including a stopping rim (not numbered) on the smaller diametrical section, and a resilient member 84 installed on the smaller diametrical section and including one end retained by the larger diametrical section and another end retained by the stopping rim as well as a securing member 83 for preventing the stopping member 82 disengaging from the hole 714 and a control member 85.

Figure 18:
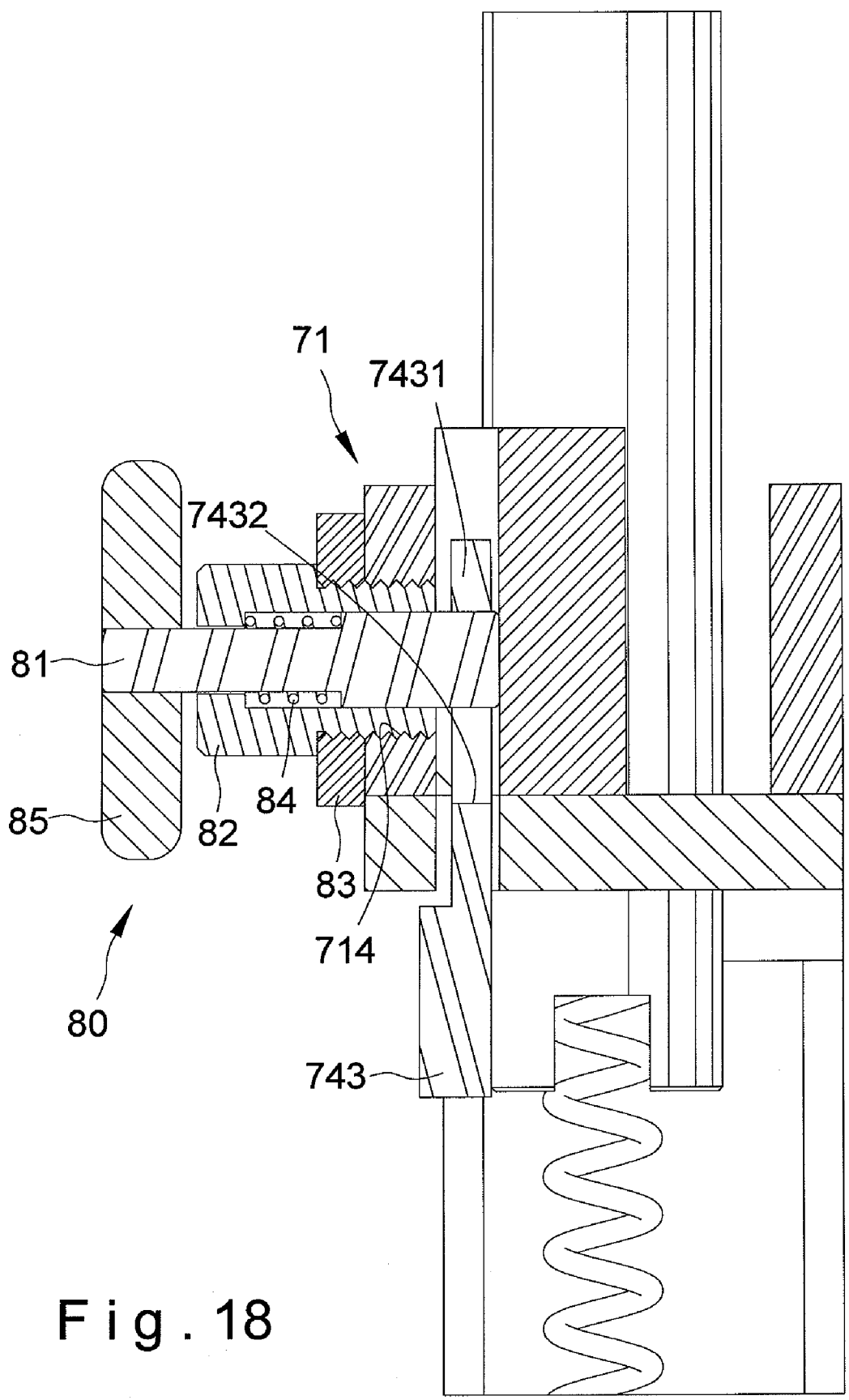
FIG. 18 is another cross-sectional view, showing the second control of the second clamping mechanism in the engaged position.
Figure 19:
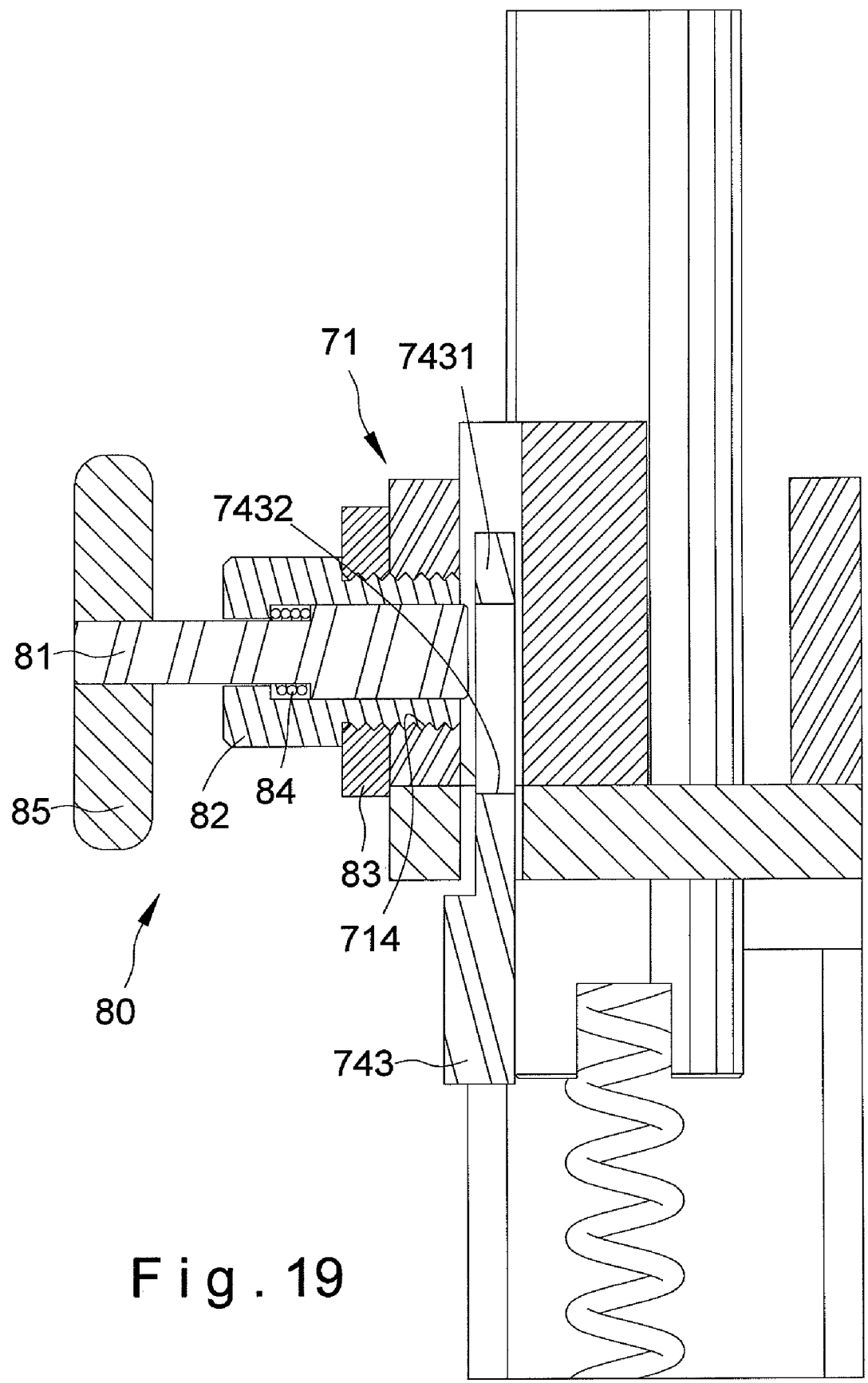
FIG. 19 is a cross-sectional view, showing the second control of the second clamping mechanism in a released position.

To hold the first bodies 741 in stationary, the retaining member 81 is moved to a first position to insert through the through hole 7432 and to be in engagement with a holding section of a positioning block 86, which is installed on the supporting strut 71 (as shown in FIG. 18). To unhold the first bodies 741, the retaining member 81 is subject to a pulling force against an elasticity of the resilient member 84 to disengage from the positioning block 86 and the through hole 7432 (as shown in FIG. 19). Preferably, user may operate the control member 85 to apply the pulling force at ease.

Referring to FIG. 12 again, the third clamping apparatus 72 may include a third engaging section which is adapted to be in engagement with the top side of the workpiece with a roller 722 so that the third engaging section and the workpiece is reduced.

While the specific embodiments have been illustrated and described, numerous modifications come to mind without significantly departing from the spirit of invention and the scope of invention is only limited by the scope of accompanying claims.

What is claimed is:

1. A device for feeding and clamping a workpiece comprising:
  a feeding device including first and second feeding apparatuses disposed opposite one another, with each of the first and second feeding apparatuses including a rolling member with ridges, and with the second feeding apparatus operably moveable toward and away from the first feeding apparatus; and
  a clamping device including first and second clamping mechanisms, with the first clamping mechanism including first and second clamping apparatuses disposed opposite to each other, with the first and second clamping apparatuses including first and second engaging sections respectively, and with the second clamping apparatus operably moveable toward and away from the first clamping apparatus, with the second clamping mechanism including a third clamping apparatus operably moveable upwardly and downwardly, and with the third clamping apparatus including a third engaging section; and
  wherein when the device feeds the workpiece the rolling members of the associated first and second feeding apparatuses are adapted to be in frictional engagement with two opposite lateral sides of the workpiece; and the first and second engaging sections of the associated first and second clamping apparatuses are adapted to be in engagement with the two lateral sides of the workpiece; and the third engaging section of the third clamping apparatus is adapted to be in engagement with a top side of the workpiece; and
  a moveable lifting device including a first body retained at a first position and a buffering apparatus including a first end connected to the first body and a second end connected to the third clamping apparatus, with the buffering apparatus being increased in length to react against a weight of the third clamping apparatus.

2. The device as claimed in claim 1 further including a first sliding member integrated with the second feeding apparatus and including a first threaded section, and a first adjustor including a shank formed with a second threaded section in engagement with the first threaded section, and wherein the first sliding member is axially moveable with respect to the first adjustor by operably rotating the second threaded section relative to the first threaded section, and wherein the second feeding apparatus is adjustably moveable in an axial direction toward and away from the first feeding apparatus by operation of the first adjustor.

3. The device as claimed in claim 1 further including a second adjustor including a shank formed with a third threaded section, a third adjustor integrated with the second clamping apparatus, and a second sliding member including a fourth threaded section in engagement with the third threaded section and a plurality of positioning sections with one of which in releasable engagement with the third adjustor, and wherein the second sliding member is axially moveable with respect to the second adjustor by operably rotating the fourth threaded section relative to the third threaded section and the third adjustor is axially moveable with respect to the second sliding member when the third adjustor is away from the plurality of positioning sections, and wherein the second clamping apparatus is adjustably moveable in an axial direction toward and away from the first clamping apparatus by moving the third adjustor away from the plurality of positioning sections and is further adjustable after the third adjustor is in engagement with one of the plurality of positioning sections by operation of the second adjustor.

4. The device as claimed in claim 1 further comprising a first control operably moveable between first position to hold the third clamping apparatus in stationary and a second position to unhold the third clamping apparatus such that the third clamping apparatus is moveable from a higher height to a lower height.

5. The device as claimed in claim 1 wherein the first control includes cam member having an eccentric shape, with the cam member being rotatable about an axis of rotation and in releasable engagement with the third clamping apparatus when the first control is in the first position.

6. The device as claimed in claim 1 wherein the first body is hollow and the buffering apparatus is receivable in the first body and is extendible out of the first body under the weight of the third clamping apparatus.

7. The device as claimed in claim 1 further comprising a second control operably moveable between a first position to hold the first body in stationary and a second position to unhold the first body such that the first body is moveable to a higher height to a lower height.

8. The device as claimed in claim 1 further comprising a link interconnecting the two first bodies and including a through hole, and a positioning block, and wherein the second control includes a retaining member including smaller and larger diametrical sections, a stopping member including a stopping rim on the smaller diametrical section, and a resilient member installed on the smaller diametrical section and including one end retained by the larger diametrical section and another end retained by the stopping rim, and wherein the retaining member is moveable between a first position to insert through the through hole and in engagement with the positioning block when the second control is in the first position, and a second position under a force against an elasticity of the resilient member to disengage from the positioning block and the through hole when the second control is in the second position.

9. The device as claimed in claim 3 wherein each of the plurality of positioning sections is spaced at a first distance, and wherein the third thread section includes a thread pitch defining a second distance, and wherein the first distance is greater than the second distance.

10. The device as claimed in claim 1 further comprising a worktable on which the first and second feeding apparatuses and the first and second clamping devices are mounted, and a supporting strut are fixed at a height spaced from the worktable, and wherein the third clamping device including a connecting member moveably installed on the supporting strut, and wherein the first body of the lifting device is moveably installed on the supporting strut.

\* \* \* \* \*